(12) United States Patent
Bunyan et al.

(10) Patent No.: US 7,141,155 B2
(45) Date of Patent: Nov. 28, 2006

(54) POLISHING ARTICLE FOR ELECTRO-CHEMICAL MECHANICAL POLISHING

(75) Inventors: Michael H. Bunyan, Chelmsford, MA (US); Thomas A. Clement, Lexington, MA (US); John J. Hannafin, Westford, MA (US); Marc E. LaRosee, Winthrop, MA (US); Kent M. Young, Carlisle, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 14 days.

(21) Appl. No.: 10/761,941

(22) Filed: Jan. 21, 2004

(65) Prior Publication Data

US 2004/0159558 A1    Aug. 19, 2004

Related U.S. Application Data

(60) Provisional application No. 60/448,199, filed on Feb. 18, 2003.

(51) Int. Cl.
*C25F 3/16* (2006.01)
*H05K 3/07* (2006.01)

(52) U.S. Cl. ........................ 205/640; 205/662
(58) Field of Classification Search .............. None
See application file for complete search history.

(56) References Cited

U.S. PATENT DOCUMENTS

| | | |
|---|---|---|
| 3,760,637 A | 9/1973 | Budinger et al. |
| 4,198,739 A | 4/1980 | Budinger et al. |
| 4,588,421 A | 5/1986 | Payne |
| 4,728,552 A | 3/1988 | Jensen, Jr. |
| 4,752,628 A | 6/1988 | Payne |
| 4,765,874 A | 8/1988 | Modes et al. |
| 4,841,680 A | 6/1989 | Hoffstein et al. |
| 4,867,757 A | 9/1989 | Payne |
| 4,882,024 A | 11/1989 | Corrigan |
| 4,927,432 A | 5/1990 | Budinger et al. |
| 4,959,113 A | 9/1990 | Roberts |

(Continued)

FOREIGN PATENT DOCUMENTS

EP    1 103 346    5/2001

(Continued)

OTHER PUBLICATIONS

Davis et al., ASM Handbook, 1992, ASM International, vol. 2, 518-519.*

(Continued)

*Primary Examiner*—Roy King
*Assistant Examiner*—Michael P. Alexander
(74) *Attorney, Agent, or Firm*—John A. Molnar, Jr.

(57) ABSTRACT

A polishing pad or other shaped article for the electrochemical mechanical polishing (ECMP) of a workpiece. The article includes an electrically-conductive compound which is formed into a layer. The compound is formulated as an admixture which includes a polymeric component forming a continuous phase in the layer, and an electrically-conductive filler component forming a discrete phase within the continuous phase. With the workpiece and the layer being electrically connected and with an electrical bias being applied between the workpiece and the layer, the bias being capable of activating an electrochemical reaction, the compound exhibits an overpotential for the activation of the reaction greater than the bias.

13 Claims, 3 Drawing Sheets

U.S. PATENT DOCUMENTS

| | | | |
|---|---|---|---|
| 4,964,919 A | 10/1990 | Payne | |
| 5,230,833 A | 7/1993 | Romberger et al. | |
| 5,257,478 A | 11/1993 | Hyde et al. | |
| 5,264,010 A | 11/1993 | Brancaleoni et al. | |
| 5,329,734 A | 7/1994 | Yu | |
| 5,382,272 A | 1/1995 | Cook et al. | |
| 5,389,352 A | 2/1995 | Wang | |
| 5,391,258 A | 2/1995 | Brancaleoni et al. | |
| 5,476,606 A | 12/1995 | Brancaleoni et al. | |
| 5,480,476 A | 1/1996 | Cook et al. | |
| 5,487,697 A | 1/1996 | Jensen | |
| 5,489,233 A | 2/1996 | Cook et al. | |
| 5,534,053 A | 7/1996 | Payne et al. | |
| 5,578,362 A | 11/1996 | Reinhardt et al. | |
| 5,605,760 A | 2/1997 | Roberts | |
| 5,624,303 A | 4/1997 | Robinson | |
| 5,645,474 A | 7/1997 | Kubo et al. | |
| 5,664,989 A | 9/1997 | Nokata et al. | |
| 5,693,239 A | 12/1997 | Wang et al. | |
| 5,707,492 A | 1/1998 | Stager et al. | |
| 5,738,567 A | 4/1998 | Manzonie et al. | |
| 5,738,800 A | 4/1998 | Hosali et al. | |
| 5,756,398 A | 5/1998 | Wang et al. | |
| 5,769,689 A | 6/1998 | Cossaboon et al. | |
| 5,770,103 A | 6/1998 | Wang et al. | |
| 5,795,218 A | 8/1998 | Doan et al. | |
| 5,807,165 A | 9/1998 | Uzoh et al. | |
| 5,823,855 A | 10/1998 | Robinson | |
| 5,860,848 A | 1/1999 | Loncki et al. | |
| 5,876,266 A | 3/1999 | Miller et al. | |
| 5,879,222 A | 3/1999 | Robinson | |
| 5,882,251 A | 3/1999 | Berman et al. | |
| 5,882,723 A | 3/1999 | Tsou | |
| 5,900,164 A | 5/1999 | Budinger et al. | |
| 5,911,619 A | 6/1999 | Uzoh et al. | |
| 5,913,713 A | 6/1999 | Cheek et al. | |
| 5,932,486 A | 8/1999 | Cook et al. | |
| 5,938,801 A | 8/1999 | Robinson | |
| 5,976,000 A | 11/1999 | Hudson | |
| 5,989,470 A | 11/1999 | Doan et al. | |
| 6,001,269 A | 12/1999 | Sethuraman et al. | |
| 6,017,265 A | 1/2000 | Cook et al. | |
| 6,019,666 A | 2/2000 | Roberts et al. | |
| 6,022,264 A | 2/2000 | Cook et al. | |
| 6,022,268 A | 2/2000 | Roberts et al. | |
| 6,030,899 A | 2/2000 | Cook et al. | |
| 6,036,579 A | 3/2000 | Cook et al. | |
| 6,042,741 A | 3/2000 | Hosali et al. | |
| 6,054,017 A | 4/2000 | Yang et al. | |
| 6,062,968 A | 5/2000 | Sevilla et al. | |
| 6,069,080 A | 5/2000 | James et al. | |
| 6,071,178 A | 6/2000 | Baker, III | |
| 6,074,546 A | 6/2000 | Sun et al. | |
| 6,093,649 A | 7/2000 | Roberts et al. | |
| 6,095,902 A | 8/2000 | Reinhardt | |
| 6,099,394 A | 8/2000 | James et al. | |
| 6,099,954 A | 8/2000 | Urbanavage et al. | |
| 6,106,754 A | 8/2000 | Cook et al. | |
| 6,117,000 A | 9/2000 | Anjur et al. | |
| 6,120,366 A | 9/2000 | Lin et al. | |
| 6,126,532 A | 10/2000 | Sevilla et al. | |
| 6,132,637 A | 10/2000 | Hosali et al. | |
| 6,143,662 A | 11/2000 | Rhoades et al. | |
| 6,159,088 A | 12/2000 | Nakajima | |
| 6,165,904 A | 12/2000 | Kim | |
| 6,168,508 B1 | 1/2001 | Nagahara et al. | |
| 6,171,181 B1 | 1/2001 | Roberts et al. | |
| 6,174,227 B1 | 1/2001 | Ishikawa | |
| 6,210,254 B1 | 4/2001 | Cook et al. | |
| 6,210,525 B1 | 4/2001 | James et al. | |
| 6,217,418 B1 | 4/2001 | Lukanc et al. | |
| 6,217,434 B1 | 4/2001 | Roberts et al. | |
| 6,218,305 B1 | 4/2001 | Hosali et al. | |
| 6,231,434 B1 | 5/2001 | Cook et al. | |
| 6,238,271 B1 | 5/2001 | Cesna | |
| 6,241,586 B1 | 6/2001 | Yancey | |
| 6,245,679 B1 | 6/2001 | Cook et al. | |
| 6,261,168 B1 | 7/2001 | Jensen et al. | |
| 6,267,659 B1 | 7/2001 | Chen et al. | |
| 6,277,015 B1 | 8/2001 | Robinson et al. | |
| 6,284,114 B1 | 9/2001 | Chechik et al. | |
| 6,287,174 B1 | 9/2001 | Detzel et al. | |
| 6,287,185 B1 | 9/2001 | Roberts et al. | |
| 6,293,852 B1 | 9/2001 | Roberts et al. | |
| 6,294,473 B1 | 9/2001 | Oliver | |
| 6,299,741 B1 | 10/2001 | Sun et al. | |
| 6,315,645 B1 | 11/2001 | Zhang et al. | |
| 6,315,857 B1 | 11/2001 | Cheng et al. | |
| 6,319,370 B1 | 11/2001 | Sun et al. | |
| 6,325,703 B1 | 12/2001 | Cook et al. | |
| 6,332,832 B1 | 12/2001 | Suzuki | |
| 6,346,032 B1 | 2/2002 | Zhang et al. | |
| 6,354,915 B1 | 3/2002 | James et al. | |
| 6,358,130 B1 | 3/2002 | Freeman et al. | |
| 6,358,854 B1 | 3/2002 | Fleming et al. | |
| 6,364,749 B1 | 4/2002 | Walker | |
| 6,368,190 B1 | 4/2002 | Easter et al. | |
| 6,375,559 B1 | 4/2002 | James et al. | |
| 6,379,223 B1 | 4/2002 | Sun et al. | |
| 6,482,307 B1 | 11/2002 | Ashjaee et al. | |
| 2001/0000497 A1 | 4/2001 | Epshteyn et al. | |
| 2001/0024878 A1 | 9/2001 | Nakamura | |
| 2001/0031610 A1 | 10/2001 | Budinger et al. | |
| 2001/0031615 A1 | 10/2001 | Jensen et al. | |
| 2002/0028646 A1 | 3/2002 | Jensen et al. | |
| 2002/0102853 A1 | 8/2002 | Li et al. | |
| 2002/0119286 A1 | 8/2002 | Chen et al. | |
| 2003/0045210 A1* | 3/2003 | Kramer | 451/41 |
| 2005/0133363 A1 | 6/2005 | Hu et al. | |

FOREIGN PATENT DOCUMENTS

| | | |
|---|---|---|
| EP | 1 112 816 | 7/2001 |
| EP | 0 919 330 | 2/2002 |
| EP | 1 361 023 | 11/2003 |
| JP | 07289442 | 11/1995 |
| JP | 09246709 | 9/1997 |
| JP | 09265998 | 9/1997 |
| JP | 09305884 | 11/1997 |
| JP | 09305885 | 11/1997 |
| JP | 10084230 | 3/1998 |
| JP | 10242900 | 8/1998 |
| JP | 10294459 | 10/1998 |
| JP | 11281153 | 1/1999 |
| JP | 11040226 | 2/1999 |
| JP | 11055246 | 3/1999 |
| JP | 11055684 | 3/1999 |
| JP | 11111126 | 4/1999 |
| JP | 11159839 | 6/1999 |
| JP | 11159841 | 6/1999 |
| JP | 11241636 | 8/1999 |
| JP | 2000134529 | 5/2000 |
| JP | 2000153142 | 5/2000 |
| WO | 98/47662 | 10/1998 |
| WO | 00/02707 | 1/2000 |
| WO | 00/71297 | 11/2000 |
| WO | 01/19567 | 3/2001 |
| WO | 01/24969 | 4/2001 |
| WO | 01/49449 | 7/2001 |
| WO | 01/63018 | 8/2001 |
| WO | 01/71796 | 9/2001 |
| WO | 02/13248 | 2/2002 |
| WO | 02/075804 | 9/2002 |
| WO | 02/084714 | 10/2002 |

WO 02/085570 10/2002

OTHER PUBLICATIONS

Article from Jul. 2002 Semiconductor Magazine entitled Chemical Mechanical Planar by Katherine Derbyshire.

Prismark Partners LLC entitled Chemical Mechanical Polishing, dated Nov. 2000.
Prismark Partners LLC entitled The Semiconductor Equipment Business, dated Mar. 2000.

* cited by examiner

POLISHING ARTICLE FOR ELECTRO-CHEMICAL MECHANICAL POLISHING

CROSS REFERENCE TO RELATED CASES

The present application claims the benefit of the filing date of U.S. Provisional Application Ser. No. 60/448,199; filed Feb. 18, 2003, the disclosure of which is expressly incorporated herein by reference.

BACKGROUND OF THE INVENTION

The present invention relates broadly to polishing articles such as pads for electrochemical mechanical polishing (ECMP), and more particularly to such articles which are formed of a layer of an electrically-conductive compound formulated as an admixture of a polymeric binder and an electrically-conductive filler.

In the general mass production of semiconductor devices, hundreds of identical "integrated" circuit (IC) trace patterns may be fabricated in several layers on a semiconducting wafer substrate which, in turn, is cut into hundreds of dies or chips. Within each of the die layers, the circuit traces, which are formed of a conductive material such as copper, aluminum, titanium, tantalum, iron, silver, gold, a conductively-doped semiconducting material, or the like, may be isolated from the next layer by an insulating material.

The fabrication of the IC trace patterns on the wafer thus may involve the deposition and removal of multiple layers of conducting, semiconducting, and/or dielectric materials. As the layers of these materials each is sequentially deposited and removed, the surface of the wafer may become relatively nonplanar. In order to assure the accuracy of the deposition and removal operations, and, ultimately, the performance of the semiconductor device, it is necessary to polish the layers to a smooth surface topography or, as is termed in the vernacular, a high degree of planarity, the terms "polish" and "planarize" often being used interchangeably, and are so used herein. In this regard, a relatively rough surface topography may be manifested as a depth of field problem resulting in poor resolution of the patterns of subsequently deposited layers, and, in the extreme, in the short circuiting of the device. As circuit densities in semiconductor dies continue to increase, any such defects become unacceptable and may render the circuit either inoperable or lower its performance to less than optimal.

To achieve the relatively high degree of planarity required for the production of substantially defect free IC dies, a chemical-mechanical polishing (CMP) process has been routinely practiced. Such process involves chemically etching the wafer surface in combination with mechanical polishing or grinding. This combined chemical and mechanical action allows for the controlled removal of material and the polishing, i.e., planarizing, of the wafer.

In essential operation, CMP is accomplished by holding the semiconductor wafer against a rotating polishing surface, or otherwise moving the wafer relative to the polishing surface, under controlled conditions of temperature, pressure, and chemical composition. The polishing surface, which may be a planar pad formed of a relatively soft and porous material such as a blown polyurethane, is wetted with a chemically reactive and abrasive aqueous slurry. The aqueous slurry, which may be either acidic or basic, typically includes abrasive particles, a reactive chemical agent such as a transition metal chelated salt or an oxidizer, and adjuvants such as solvents, buffers, and passivating agents. Within the slurry, the salt or other agent provides the chemical etching action, with the abrasive particles, in cooperation with the polishing pad, providing the mechanical polishing action.

An abrasive also may be incorporated into the pad itself, such pads being termed "fixed abrasive" pads. When used in conjunction with these fixed abrasive pads, the slurry may provide additional abrasive or, alternatively, with the abrasive being supplied only by the pad, the slurry may be provided instead as a substantially abrasive-free solution. For the purposes of the present description, however, the terms "slurry" and "solution" may be used interchangeably unless otherwise indicated.

The basic CMP process is further described in the articles Derbyshire, K., "Making CMP Work," Semiconductor Magazine, pp. 40–53, July 2002; "The Semiconductor Equipment Business," Prismark Partners LLC, Cold Spring Harbor, N.Y., March 2002; and "CMP," Prismark Partners, LLC, Cold Spring Harbor, N.Y., November 2000, and in the following U.S. Pat. Nos. 5,709,593; 5,707,274; 5,705,435; 5,700,383; 5,665,201; 5,658,185; 5,655,954; 5,650,039; 5,645,682; 5,643,406; 5,643,053; 5,637,185; 5,618,227; 5,607,718; 5,607,341; 5,597,443; 5,407,526; 5,395,801; 5,314,843; 5,232,875; and 5,084,071. Polishing pads are further described in the following references: U.S. Pat. Nos. 3,760,637; 4,198,739; 4,462,188; 4,588,421; 4,728,552; 4,752,628; 4,841,680; 4,927,432; 4,959,113; 4,964,919; 5,230,833; 5,257,478; 5,264,010; 5,329,734; 5,382,272; 5,389,352; 5,476,606; 5,480,476; 5,487,697; 5,489,233; 5,534,053; 5,578,362; 5,605,760; 5,624,303; 5,645,474; 5,664,989; 5,693,239; 5,707,492; 5,738,567; 5,738,800; 5,769,689; 5,770,103; 5,795,218; 5,823,855; 5,860,848; 5,876,266; 5,879,222; 5,882,251; 5,900,164; 5,913,713; 5,932,486; 5,938,801; 5,976,000; 5,989,470; 6,001,269; 6,017,265; 6,019,666; 6,022,264; 6,022,268; 6,030,899; 6,036,579; 6,042,741; 6,054,017; 6,062,968; 6,609,080; 6,071,178; 6,074,546; 6,093,649; 6,095,902; 6,099,394; 6,099,954; 6,106,754; 6,117,000; 6,120,366; 6,126,532; 6,132,647; 6,143,662; 6,174,227; 6,159,088; 6,165,904; 6,168,508; 6,171,181; 6,179,950; 6,210,254; 6,210,525; 6,217,418; 6,217,434; 6,218,305; 6,231,434; 6,238,271; 6,241,586; 6,245,679; 6,261,168; 6,267,659; 6,277,015; 6,284,114; 6,287,174; 6,287,185; 6,293,852; 6,294,473; 6,315,645; 6,315,857; 6,319,370; 6,325,703; 6,332,832; 6,346,032; 6,354,915; 6,358,130; 6,358,854; 6,364,749; and 6,375,559; U.S. Patent Application Publication Nos. 2001/0000497; 2001/0024878; 2001/0031610; 2001/0031615; and 2002/0028646; European Patent Nos. 0,919,330 and 1,112,816; International Application Nos. WO 98/47662; WO 00/02707; WO 00/71297; WO 01/19567; WO 01/24969; WO 01/49449 and WO 02/13248; and Patent Abstracts of Japan Nos. 0728944; 11055246; 10055684; 2000134529; 09305885; 09305884; 11040226; 2000153142; 11111126; 10084230; 09246709; 09265998; 10242900; 10294459; 11159839; 1159841; 11241636; and 11281153.

Looking to FIG. 1, a representative CMP process and apparatus are illustrated schematically at 10. The apparatus 10, which is illustrated to be of a "rotational"-type, includes a wafer carrier, 12, for holding a semiconductor wafer or other workpiece, 14. A polishing pad, 16, is positioned between wafer carrier 12 and wafer 14, with the wafer being held against the pad by a partial vacuum, frictionally, or with an adhesive. Wafer carrier 12 is provided to be continuously rotated by a drive motor, 18, in the direction referenced at 20, and additionally may be reciprocated transversely in the directions referenced at 22. In this regard, the combined rotational and transverse movements of the wafer 14 are intended to reduce the variability in the material removal rate across the work surface 23 of the wafer 14.

Apparatus 10 additionally includes a platen, 24, which is rotated in the direction referenced at 26, and on which is mounted a polishing pad, 28. As compared to wafer 14, platen 24 is provided as having a relatively large surface area to accommodate the translational movement of the wafer on the carrier 12 across the surface of the polishing pad 28.

A supply tube, 30, is mounted above platen 26 to deliver a stream of polishing slurry, referenced at 32, which is dripped or otherwise metered onto the surface of pad 28 from a nozzle or other outlet, 34, of the tube 30. The slurry 32 may be gravity fed from a tank or reservoir (not shown), or otherwise pumped through supply tube 30. Alternatively, in an "orbital" variant of apparatus 10 (not shown), slurry 32 may be supplied from below platen 26 such that it flows upwardly from the underside of polishing pad 28 and through holes which may be formed in the pad 28. Apparatus 10 also may be provided to be of a continuous belt-type.

Increasingly, the planarization of the surfaces of the metal layers deposited on the wafer is assisted by the use of an electrolytic polishing slurry or solution by means of a process known as electrochemical mechanical planarization (ECMP). With continuing reference to FIG. 1, a deposited metal layer of the wafer 14, which layer may be considered for present purposes to be the work surface 23, the electrolytic slurry or solution 32, and a cathode electrode, 40, which is coupled to or otherwise is in contact with the pad 28, are connected to a voltage potential source, 42, to complete an electrochemical circuit or cell, referenced at 44. With a bias applied between the cathode 40 and the surface 23, material in the form of metal ions may be removed by the disassociative oxidation from the surface 23 which functions as an anode in the circuit 44. These ions, which dissolve or otherwise into the slurry 32, then may either plate at the cathode 40 or be washed away with the slurry. The rate at which the material is removed generally is determined by the control of such system parameters as the concentration of electrolyte in the slurry 32 and the voltage potential applied by the source 42. The ECMP process is further described in the following references: U.S. Pat. Nos. 6,482,307; 6,379,223, 6,368,190, 6,299,741, 5,911,619, and 5,807,165; U.S. 2002/0102853; WO 02/085570, 02/075804, 02/084714, 01/71796, and 01/63018; and EP 1,103,346.

It has been observed, however, that when utilized in ECMP tools or systems, conventional polishing pads, which typically are formed of non-electrically conductive materials, may interfere with the application of the bias to the work surface. The result is a non-uniform or variable dissolution of material from the work surface. Accordingly, it is believed that improved conductive polishing pads would be well-received by the semiconductor manufacturing industry. Especially desired would be a pad offering improved performance life when used in ECMP tools or systems.

BROAD STATEMENT OF THE INVENTION

The present invention is directed to polishing articles such as pads for electrochemical mechanical polishing (ECMP), and more particularly to such articles which are formed of a layer of an electrically-conductive compound formulated as an admixture of a polymeric component which forms a continuous phase in the layer, and an electrically-conductive filler component which forms a discrete phase within the continuous phase. Advantageously, as formulated in accordance with the precepts of the present invention, such pads exhibit generally stable physical and electrical properties, and, in addition, increased durability and improved service life.

Particularly, the compound is formulated to exhibit an overpotential for the activation of the reduction of water, or of another electrochemical reaction, within the electrochemical cell or circuit. That is, with the layer of the pad or other shaped article being electrically connected to a wafer or other workpiece, and with an electrical bias being applied between the workpiece and the pad, and the bias being capable of activating an electrochemical reaction, the compound exhibits an overpotential for the activation of the reaction such that the potential therefor is preferably greater than the bias.

As further described, for example, in U.S. Pat. Nos. 5,882,723; 4,882,024; and 4,765,874, for electrolysis or electrodeposition processes, such as ECMP, performed with the evolution, for example, of oxygen at one of the electrodes and hydrogen at the other, the actual voltage or potential required to activate the hydrolysis reaction is known to be greater than the theoretical voltage which may be calculated based on thermodynamic data. The difference between the higher and the theoretical voltage, which difference is often termed "overvoltage" or "overpotential," must be applied in order to overcome the various inherent resistances within the given electrochemical cell. Most often, electrodes which exhibit a low overpotential are desired as it is known that a reduction in the amount of applied overvoltage represents a significant savings of the energy costs associated with the operation of the cell.

In the present application, however, it has been discovered that polishing pads which are formed of a material exhibiting a relatively high overpotential are most desired for ECMP processes. In this regard, it is believed that current flow through the pad under the applied bias proceeds through the evolution, for example, and as depending upon the composition of the electrolytic solution which is employed, of hydrogen and oxygen gas, and is accompanied by the gradual deterioration of the material of the pad. With, for example, oxygen evolution occurring at the cathode electrode which is coupled to the pad, it is speculated that the deterioration of the pad material is related to the current flux which activates the oxygen evolution reaction, and that the reduction in the current will result in less degradation of the pad material, more uniform physical and electrical properties, and an increase in service life. Regarding the voltage flux, the growth of oxygen bubbles on the surface of the electrode and pad decreases the area thereof which is in contact with the electrolytic solution, and thereby causes the current density to increase. It is believed that this increase in current density, with a given current flowing through a smaller surface area, increases the deterioration of the pad material. Empirical observations have confirmed that the more stable pad materials have higher overpotential for the evolution of oxygen. For example, with the theoretical thermodynamic potential difference required to hydrolyze water into hydrogen and oxygen being given as about 1.23 volts versus the normal or standard hydrogen electrode, materials, or more precisely the electrically-conductive filler in those materials, having an overvoltage, such as at least about 1 volt, i.e., a potential for the electrolysis of water of at least about 2.25 volts, are believed would exhibit the stability which would be required for many ECMP pad applications.

The present invention, accordingly, comprises the article, system, and method possessing the composition, combination of elements, and arrangement of parts and steps which are exemplified in the detailed disclosure to follow. Advantages of the present invention include electrically-conductive polishing pads and other shaped articles for electrochemical mechanical polishing (ECMP) which afford stable physical and electrical properties with increased durability and improved service life. Moreover, although the polishing pads of the present invention may provide some polishing or planarization when used without bias, the pads advantageously exhibit a large, e.g., 2× or more, improvement in polishing or planarization rate when used with a bias. Indeed, its has been observed that for more optimal bias performance, the pad may be formulated as described herein such that its non-basis planarization rate is relatively low.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
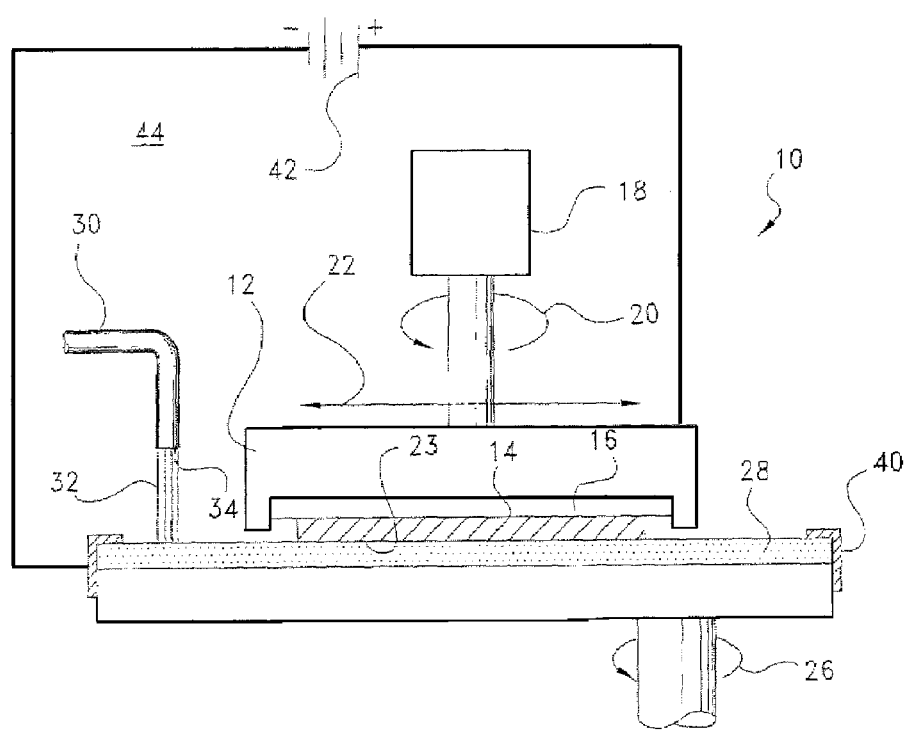
FIG. 1 is a schematic view of a representative process for the CMP of a wafer, and as modified for the ECMP of such wafer.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "vertical" and "axial" or "horizontal" referring, respectively, to directions or planes perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows or underscores.

For the illustrative purposes of the discourse to follow, the polishing article of the present invention is described in connection with its configuration as a pad for use within the apparatus 10 of FIG. 1. It will be appreciated, however, that aspects of the present invention, which may be provided in other shapes, and in forms other than pads such as rolls, sheets, or belts, may find use in other tools or systems. Such alternative shapes and forms therefore should be considered to be expressly within the scope of the present invention.

Figure 2:
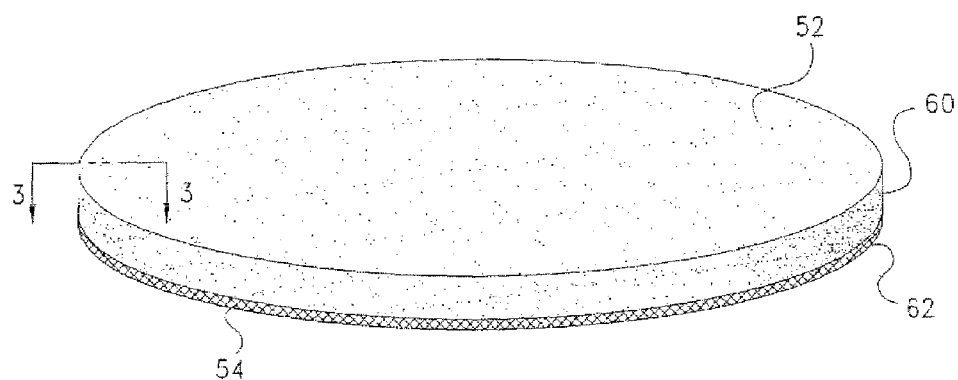
FIG. 2 is an isometric view of a representative polishing pad in accordance with the present invention.
Figure 3:
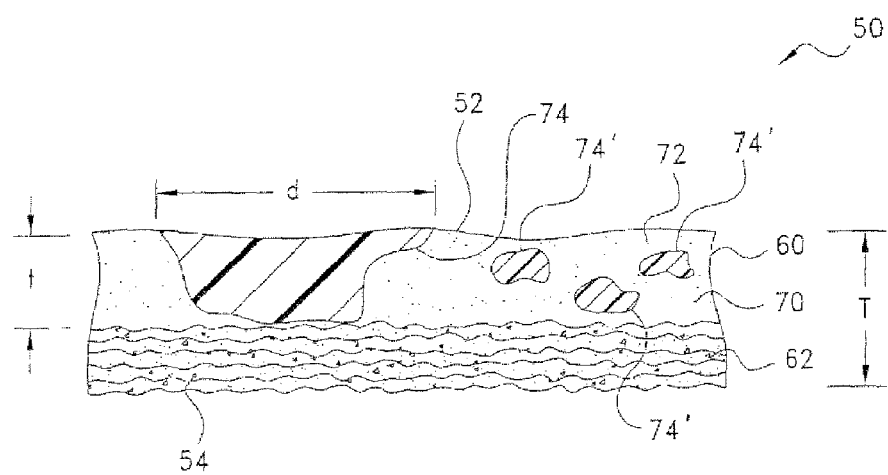
FIG. 3 is a magnified cross-sectional view of the polishing pad of FIG. 2 taken through line 3—3 of FIG. 2.

Referring then to the figures wherein corresponding reference characters are used to designate corresponding elements throughout the several views with equivalent elements being referenced with prime or sequential alphanumeric designations, a representative polishing article in accordance with the present invention is shown generally at 50 in perspective in FIG. 2 and in cross-section in FIG. 3. With momentary reference again to FIG. 1, as used, for example, as the pad 16 within the apparatus 10, article 50 may be electrically coupled to the cathode electrode 40, and further may be connected electrically to the surface 23 via the electrolytic solution 32, which may be non-abrasive, and/or via direct contact therewith so as to complete the electrochemical cell 44. With additional reference to FIGS. 2 and 3, in this regard, article 50 is provided as having a generally planar polishing, planarizing, or other processing surface, 52, which may be disposed in direct physical contact against the workpiece surface 23 (FIG. 1), and an opposite surface, 54, which may be received on the platen 24 of the apparatus 10 (FIG. 1).

Referring now again to FIGS. 2 and 3, article 50, which for many applications may have an overall thickness, referenced at "T" in the cross-sectional view of FIG. 2, of between about 2–40 mils (0.05–1 mm), and may be provided in the form of, or as formed from, a sheet, roll, tape, die-cut part, or the like. In basic construction, article 50 is a formed of a layer, 60, of an electrically-conductive compound formulated in accordance with the precepts of the present invention and, in the illustrated, embodiment, a carrier sheet or layer, 62, which supports the layer 60. It should be appreciated, however, that carrier 62 is optional, and that article 50 therefore may consist essentially of the layer 60 only, or as laminated with one or more layers, such as a foam layer or other backing, other than, or in addition to, the carrier 62 as shown.

In the illustrated embodiment, carrier 62 may be provided as a film of a plastic or other polymeric material, a woven or non-woven, e.g., needled, fabric, cloth, web, or mat, or an aluminum or other metal foil, screen, or expanded mesh. Such carrier 62 may improve the physical strength of the article 50 to better facilitate the handling thereof, as well as die cutting or other finishing operations. The carrier will have a thickness of between about 0.5–10 mils (12.5–125 μm).

For many applications, it may be preferred that that the carrier 62 be rendered electrically-conductive, such as to a surface resistivity about 0.1 Ω/sq. or less. In this regard, the carrier may be provided as a metallized plastic film, a metal foil, or, preferably, an electrically-conductive mesh which may be a fabric, cloth, web, mat, screen, or other sheet or layer which may be woven, non-woven, e.g., needled, knitted, expanded, rolled, compressed, or otherwise formed. Such mesh may be rendered electrically-conductive by being formed of wires, monofilaments, yarns, bundles, or other fibers or materials which are inherently electrically-conductive or, alternatively, which are non-conductive but are rendered conductive by means of an applied coating, plating, sputtering, or other treatment of an electrically-conductive material. When provided as being electrically-conductive, the carrier 62 may be used to couple the article 50 to the electrode 40 (FIG. 1), such as by providing contacts between the carrier and the electrode.

Representative inherently electrically-conductive materials for carrier 62 include metals such as copper, nickel, silver, aluminum, steel, tin, and bronze, alloys thereof such as Monel nickel-copper alloy, non-metals such as carbon, graphite, and inherently conductive polymers, and plated or clad wires or other fibers such as one or more of copper, nickel, silver, aluminum, steel, tin, bronze, or an alloy thereof coated with one or more of copper, nickel, silver, aluminum, steel, tin, bronze, or an alloy thereof, e.g., silver-plated copper, nickel-clad copper, Ferrex® (Parker Chomerics, Woburn, Mass.) tin-plated copper-clad steel, tin-clad copper, and tin-plated phosphor bronze. Representative non-conductive fibers include cotton, wool, silk, cellulose, polyester, polyamide, nylon, and polyimide monofilaments or yarns which are plated, clad, or otherwise coated with an electrically-conductive material which may be a metal such as copper, nickel, silver, aluminum, tin, or an alloy or combination thereof, or a non-metal such as carbon, graphite, or conductive polymer, thereof. As is known, the plating, cladding, or other coating may applied to individual fiber strands or to the surfaces of the fabric after weaving, knitting, or other fabrication. Combinations such as of one or more of the foregoing conductive fibers, one or more of the foregoing coated non-conductive fibers, and one or more of the foregoing conductive fibers and one or more of the foregoing coated non-conductive fibers also may be employed.

Insofar as fabrics and cloths may find particular application, a preferred fabric construction for carrier 62 may be a non-woven, 9 mil (0.23 mm) thick, 2.6 oz/yd$^2$ (87 g/m$^2$) weight, copper-plated pin bonded nylon (PBN), and between about 0.5–10% by weight, based on the total fabric weight, of the copper plating. As may be seen in FIG. 3, in the case of fabrics, cloths, screens, and other meshes or materials having at least some degree of porosity, the layer 60 may partially or, as shown, substantially completely impregnate the carrier 62 through to the surface 54 of the article 50. The layer 60 may be coated on, bonded to, or otherwise joined to, or incorporated in, and made integral with a sheet or other layer of the carrier 62 to provide, as shown, the laminar structure of article 50.

The electrically-conductive compound of the first layer 20 may be formulated in accordance with the precepts of the present invention as a blend or other admixture of a resin or other polymeric component, and an electrically-conductive, particulate fillers. The polymeric component, which itself may be a blend or other admixture, may be a thermoplastic or thermoset, and specifically may be selected as depending upon one or more of operating temperature, hardness, chemical compatibility, resiliency, compliancy, compression-deflection, compression set, flexibility, ability to recover after deformation, modulus, tensile strength, elongation, force defection, flammability, or other chemical or physical property with, particularly, a hardness of between about 15–75 Shore D being considered preferred for many applications. Depending upon the application, suitable materials may include, particularly, polyurethanes, as well as silicones, fluorosilicones, polycarbonates, ethylene vinyl acetates (EVA), acrylonitrile-butadiene-styrenes (ABS), polysulfones, acrylics, polyvinyl chlorides (PVC), polyphenylene ethers, polystyrenes, polyamides, nylons, polyolefins, poly(ether ether ketones), polyimides, polyetherimides, polybutylene terephthalates, polyethylene terephthalates, fluoropolymers, polyesters, acetals, liquid crystal polymers, polymethylacrylates, polyphenylene oxides, polystyrenes, epoxies, phenolics, chlorosulfonates, polybutadienes, buna-N, butyls, neoprenes, nitriles, polyisoprenes, natural rubbers, and copolymer rubbers such as styrene-isoprene-styrenes (SIS), styrene-butadiene-styrenes (SBS), ethylene-propylenes (EPR), ethylene-propylene-diene monomers (EPDM), nitrile-butadienes (NBR), and styrene-butadienes (SBR), and copolymers and blends thereof. In the case of polyurethanes, the polyurethane may be a thermoplastic polyurethane (TPU) or thermosetting, and may be based on a urethane linkage reaction between a diisocyante, such as diphenylmethane diisocyanate (MDI), tolidine diisocyanate (TDI), or p-phenylenediisocyanate (PPDI), and a polyol which may be polyether, polyester, or other resin-based. Any of the forgoing materials may be used unfoamed or, if required by the application, blown or otherwise chemically or physically processed into an open or closed cell foam.

As is referenced at 70 in the cross-sectional view of FIG. 3, the polymeric component generally forms a binder or other continuous or matrix phase within the compound into which the electrically-conductive particulate filler, referenced at 72, is dispersed as a discrete phase. The filler is included within the binder in a proportion sufficient to provide the level of electrical conductivity which is desired for the intended application. For most applications, a bulk or volume resistivity of not greater than about 1 $\Omega$-cm, and/or a surface resistive of not greater than about 2 $\Omega$/sq., would be considered acceptable, and would translated to a filler loading which generally is between about 25–95% by weight, based on the total volume or weight, as the case may be, of the compound.

Depending upon the application and, particularly, the material of the layer 23 (FIG. 1) being polished, the size and shape of the filler may or may not be critical. In general, however, the filler may be of any shape, or mixture of shapes, and is referred broadly herein as being "particulate," which should be understood to include solid or hollow spheres and microspheres, elastomeric balloons, flakes, platelets, fibers, rods, irregularly-shaped particles, fibers, which may be chopped or milled or whiskers, and, especially, powders. For many applications, the particle size or distribution of the filler typically will range from between about 0.01–10 mil (0.25–250 µm), which may be a diameter, imputed diameter, length, or other dimension of the particulate.

Suitable electrically-conductive fillers include: nonmetals such as carbon or graphite; noble and non-noble metals such as nickel, copper, tin, aluminum, and nickel; noble metal-plated noble or non-noble metals such as gold or silver-plated copper, nickel, aluminum, tin, or gold; non-noble metal-plated noble and non-noble metals such as tin or nickel-plated copper, silver, bismuth, indium, or lead; and noble or non-noble metal plated non-metals such as gold, silver and/or nickel-plated or clad graphite, i.e., gold plated nickel clad graphite, glass, ceramics, plastics, elastomers, or mica; and mixtures thereof. The electrically-conductive filler specifically may be selected as depending upon one or more of conductivity, lubricity, resin demand, hardness, chemical compatibility, such as with the polymeric component and/or the material of the work surface 23 (FIG. 1), and cost.

Particularly in the case of the layer 23 (FIG. 1) being formed of copper, tin or graphite powders or other particles, or a mixture thereof, may be preferred. In this regard, it generally may be preferred, at least in the case of the processing surface 52 of the article 50 being in polishing contact the work surface 23 (FIG. 1) of the wafer, that the material of the filler 72 be provided as being softer, or at least not appreciably harder, than the material of the work surface 23 so as to minimize any potential for scratching or otherwise causing damage to the work surface. By way of example, the copper of the work surface 23 may have a Moh's hardness of between about 2.5–3, with the tin and graphite filler particles having a Moh's hardness of between about 1.5–1.8 for tin, and between about 0.5–1 for graphite.

Additional fillers and additives may be included in the formulation of the compound depending upon the requirements of the particular application envisioned. Such fillers and additives, which may be functional or inert, may include ceramic or other fixed abrasive particles, wetting agents or surfactants, pigments, dispersants, dyes, and other colorants, opacifying agents, foaming or anti-foaming agents, antistatic agents, coupling agents such as titanates, chain extending oils, tackifiers, flow modifiers, pigments, lubricants such as molybdenum disulfide ($MoS_2$), silanes and peroxides, such as Varox® (R.T. Vanderbilt Co., Inc., Norwalk, Conn.), dibenzylperoxide, dicumylperoxide, or other organic or inorganic peroxides, film-reinforcing polymers and other agents, stabilizers, emulsifiers, antioxidants, thickeners, and/or flame retardants and other fillers such as aluminum trihydrate, antimony trioxide, metal oxides and salts, intercalated graphite particles, phosphate esters, decabromodiphenyl oxide, borates, phosphates, halogenated compounds, glass, silica, which may be fumed or crystalline, silicates, mica, and glass or polymeric microspheres. Typically, these fillers and additives are blended or otherwise admixed with the formulation, and may comprise between about 0.05–80% or more by total volume thereof.

In accordance with one aspect of the present invention, the admixture of the compound additionally may comprise a resin filler component. With reference again to the somewhat stylized morphological, i.e., photomicrographical, depiction of article 50 shown in FIG. 3, the resin filler forms a second dispersed phase subsisting as discrete domains, one of which is referenced at 74, within the continuous phase 70, but as distinguished from the phase 70 by the absence, or substantial absence, of electrically-conductive filler particles 72 or other fillers which could act as substantial abrasives against the work surface 23 (FIG. 1) of the wafer. The domains 74 may have a major diametric or other extent, referenced at "d" in FIG. 3, of between about 0.08–2 mils (2–50 µm) and, depend upon the degree of dispersion within the matrix phase 70 and the particle size of the constituent charge, such domains 74 may be formed of individual resin particles or of agglomerations of such particles. As used herein, the term "discrete domains" should be understood to refer to either such domains either as particles or to agglomerations thereof.

The resin filler component, which, like the polymeric component, may be a blend or other admixture, may be a thermoplastic or thermoset, and again specifically may be selected as depending upon one or more of operating temperature, hardness, chemical compatibility, resiliency, compliancy, compression-deflection, compression set, flexibility, ability to recover after deformation, modulus, tensile strength, elongation, force defection, flammability, or other chemical or physical property with, particularly, a hardness of between about 15–75 Shore D being considered preferred for many applications. Depending upon the application, the resin filler component and the polymeric component may be of the same composition, or of different composition. Suitable materials for the resin filler component thus may include, particularly, polyurethanes, as well as silicones, fluorosilicones, polycarbonates, ethylene vinyl acetates (EVA), acrylonitrile-butadiene-styrenes (ABS), polysulfones, acrylics, polyvinyl chlorides (PVC), polyphenylene ethers, polystyrenes, polyamides, nylons, polyolefins, poly (ether ether ketones), polyimides, polyetherimides, polybutylene terephthalates, polyethylene terephthalates, fluoropolymers, polyesters, acetals, liquid crystal polymers, polymethylacrylates, polyphenylene oxides, polystyrenes, epoxies, phenolics, chlorosulfonates, polybutadienes, buna-N, butyls, neoprenes, nitriles, polyisoprenes, natural rubbers, and copolymer rubbers such as styrene-isoprene-styrenes (SIS), styrene-butadiene-styrenes (SBS), ethylene-propylenes (EPR), ethylene-propylene-diene monomers (EPDM), nitrile-butadienes (NBR), and styrene-butadienes (SBR), and copolymers and blends thereof. These materials may be cryogenically ground or otherwise milled or processed to form reticulate or other particulates.

As may be seen with reference again to FIG. 3, the domains 74 of the resin filler component may comprise a portion of the polishing surface 52, such as by having a thickness, referenced at "t" for the domain referenced at 74, or other dimension such that the domains extend through the thickness of the layer 60, or such as by being provided, as shown by the domains commonly referenced at 74', as dispersed throughout the thickness dimension of the layer 60 so as to be exposed as the surface 52 wears or is dressed. As forming a portion of the polishing surface 52, the domains of the resin filler component may modify the properties, such as coefficient of friction or hardness, thereof so as to assist in the polishing of the work piece surface. In addition, the domains 74, by acting as a filler, may improve the conductivity of the electrically-compound by increasing the degree of particle-to-particle contact of the electrically-conductive filler so as to achieve a higher conductivity for a given loading level. The domains 74 also may assist in minimizing pad wear by function as abrasion-resistant stops within the layer 60.

In the production of commercial quantities of article 50, the polymeric and electrically-conductive filler components of the electrically-conductive compound of layer 60, along with any additional fillers or additives such as the resin filler component, may be compounded under general conditions of high shear and, optionally, temperature, in a roll mill or other mixer. Thereafter, a layer 60 of the compound may be coated on the carrier 62, or on a release sheet or other substrate in the absence of a carrier, in a conventional manner such as by, for example, spraying, knife coating, roller coating, casting, drum coating, dipping, dispensing, extrusion, screen printing, or other direct process, or by a transfer or other indirect process. After coating, the resultant layer 60 may be hardened, solidified, or otherwise cured, such as by a chemical cross-linking or other reaction, or by a physical process such as drying or cooling, to develop an adherent film, coating, or other residue or deposition of the layer 60 on the substrate.

Figure 4:
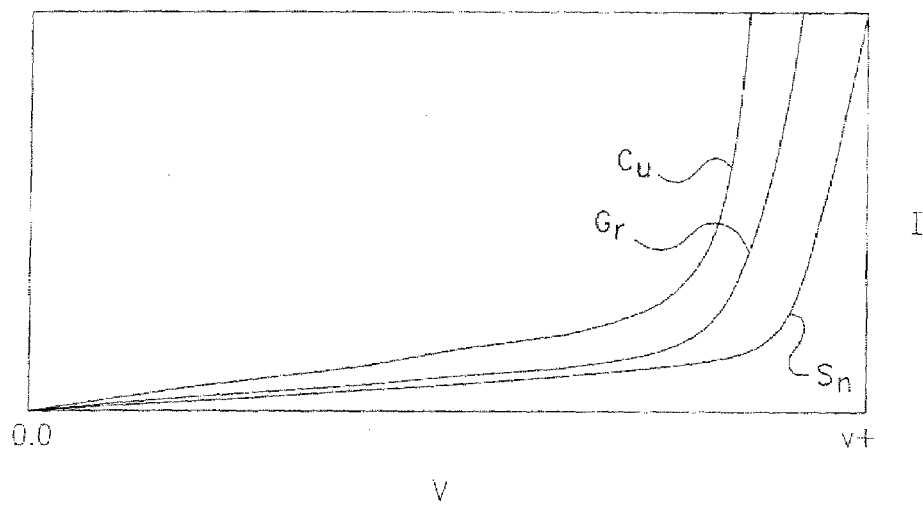
FIG. 4 is an empirically-derived plot depicting standardized current-voltage curves comparing the overpotential of representative fillers for the compounds of the polishing articles of the present invention.

Referring lastly to FIG. 4, the overvoltage curves of several representative materials for the electrically-conductive filler component are graphically depicted as plots of current versus voltage. The curves of FIG. 4 may be empirically obtained, such within an electrochemical cell as measured against a standard calomel electrode (SCE) as the anode. In FIG. 4, curves are shown for copper (Cu), graphite (Gr), and tin (Sn) over the first quadrant, with oxidation increasing along the x-axis. As may be seen, the curves for Gr and Sn are displaced to the positive of the Cu curve, and indicates higher oxygen overpotentials, i.e., the Cu electrode evolving oxygen at less positive potentials than the Gr and Sn electrodes. From these data, it may be concluded that a graphite or tin-filled compound would be more stable when used in the polishing articles herein than a copper-filled compound. As used herein, the terms "overvoltage" and "overpotential" may be used in reference to, interchangeably, the compound and/or the filler in the compound.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. An electrochemical mechanical polishing (ECMP) method for processing a surface of a workpiece, said method comprising the steps of:
    (a) providing a polishing article, the article comprising an electrically-conductive compound which is formed into a layer having a processing surface, said compound comprising an admixture which comprises:
        (I) a polymeric component forming a continuous phase in said layer; and
        (II) an electrically-conductive filler component comprising tin particles forming a first discrete phase within said continuous phase,
    (b) electrically connecting the layer of step (a) to the workpiece; and
    (c) applying an electrical bias between the workpiece and the layer, the bias being capable of activating an electrochemical reaction, and the compound of the layer exhibiting an overpotential for the activation of said reaction.

2. The ECMP method of claim 1 wherein the layer of step (a) has a processing surface, and wherein the method further comprising the additional step following step (a) of:
    disposing the surface of the workpiece against the processing surface of the layer.

3. The ECMP method of claim 2 wherein said overpotential is at least about 1 V.

4. The ECMP method of claim 2 wherein said polymeric component comprises a urethane polymer or copolymer.

5. The ECMP method of claim 2 wherein the compound comprises, by total weight of the components (I) and (II), between about 25–95% of the electrically-conductive filler component.

6. The ECMP method of claim 2 wherein the electrically-conductive filler component comprises particles having a mean average particle size of between about 0.01–10 mil (0.25–250 µm).

7. The ECMP method of claim 2 wherein the compound has an electrical volume resistivity of not greater than about 1Ω-cm.

8. The ECMP method of claim 2 wherein the admixture further comprises:
    (III) a resin filler component forming a second discrete phase within said continuous phase, said second discrete phase being solid and substantially free of said electrically-conductive filler component.

9. The FCMP method of claim 8 wherein the compound comprises, by total weight of the components (I), (II), and (III), between about 1–10% of the resin filler component.

10. The ECMP method of claim 8 wherein the resin filler component comprises particles having a mean average particle size of between about 0.08–2 mil (2–50 µm).

11. The ECMP method of claim 8 wherein said resin filler component comprises particles of one or more thermoplastic resins.

12. The ECMP method of claim 2 wherein said article further comprises a carrier, said layer of said electrically-conductive compound being supported on said carrier.

13. The ECMP method of claim 12 wherein said carrier comprises a sheet of an electrically-conductive mesh.

* * * * *